T. P. PYE.
DRIER.
APPLICATION FILED AUG. 19, 1920.

1,420,144.

Patented June 20, 1922.
2 SHEETS—SHEET 2.

Witness

Inventor
T. P. Pye.

UNITED STATES PATENT OFFICE.

THOMAS P. PYE, OF GRATON, CALIFORNIA.

DRIER.

1,420,144.　　Specification of Letters Patent.　Patented June 20, 1922.

Application filed August 19, 1920. Serial No. 404,523.

*To all whom it may concern:*

Be it known that I, THOMAS P. PYE, a citizen of the United States, residing at Graton, in the county of Sonoma and State of California, have invented a new and useful Drier, of which the following is a specification.

This invention relates to a drier especially designed for use in drying fruits and vegetables, one of its objects being to provide a simple, compact and efficient structure which will quickly drive off the moisture from the material supplied to the apparatus, said moisture being carried off to the outer atmosphere while the material, when leaving the drier, will be in a dried condition ready to be packed.

Another object is to provide a structure formed of few parts and which can be operated easily.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
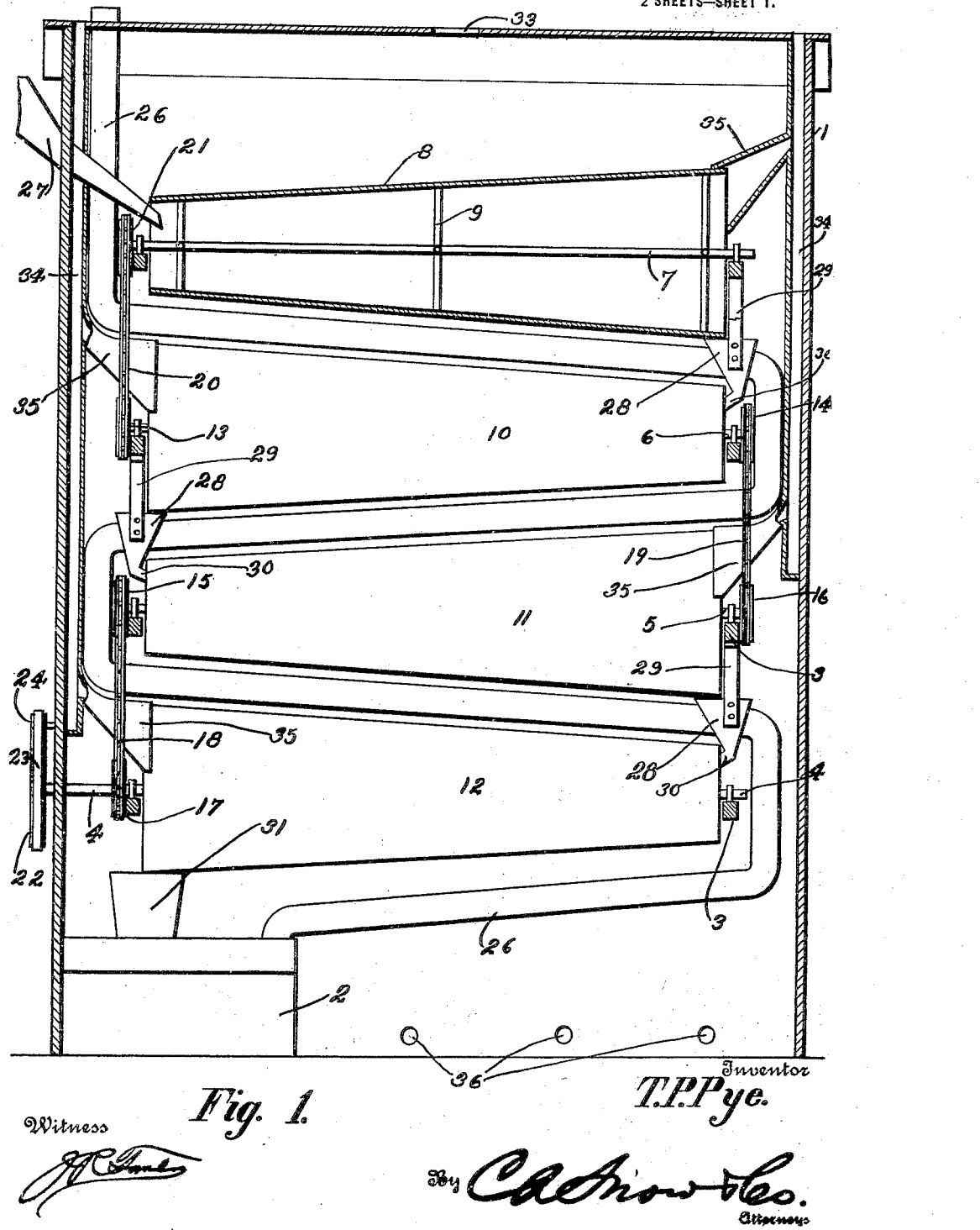
Figure 1 is a vertical longitudinal section through the apparatus, one of the drying drums being shown in section.
Figure 2:
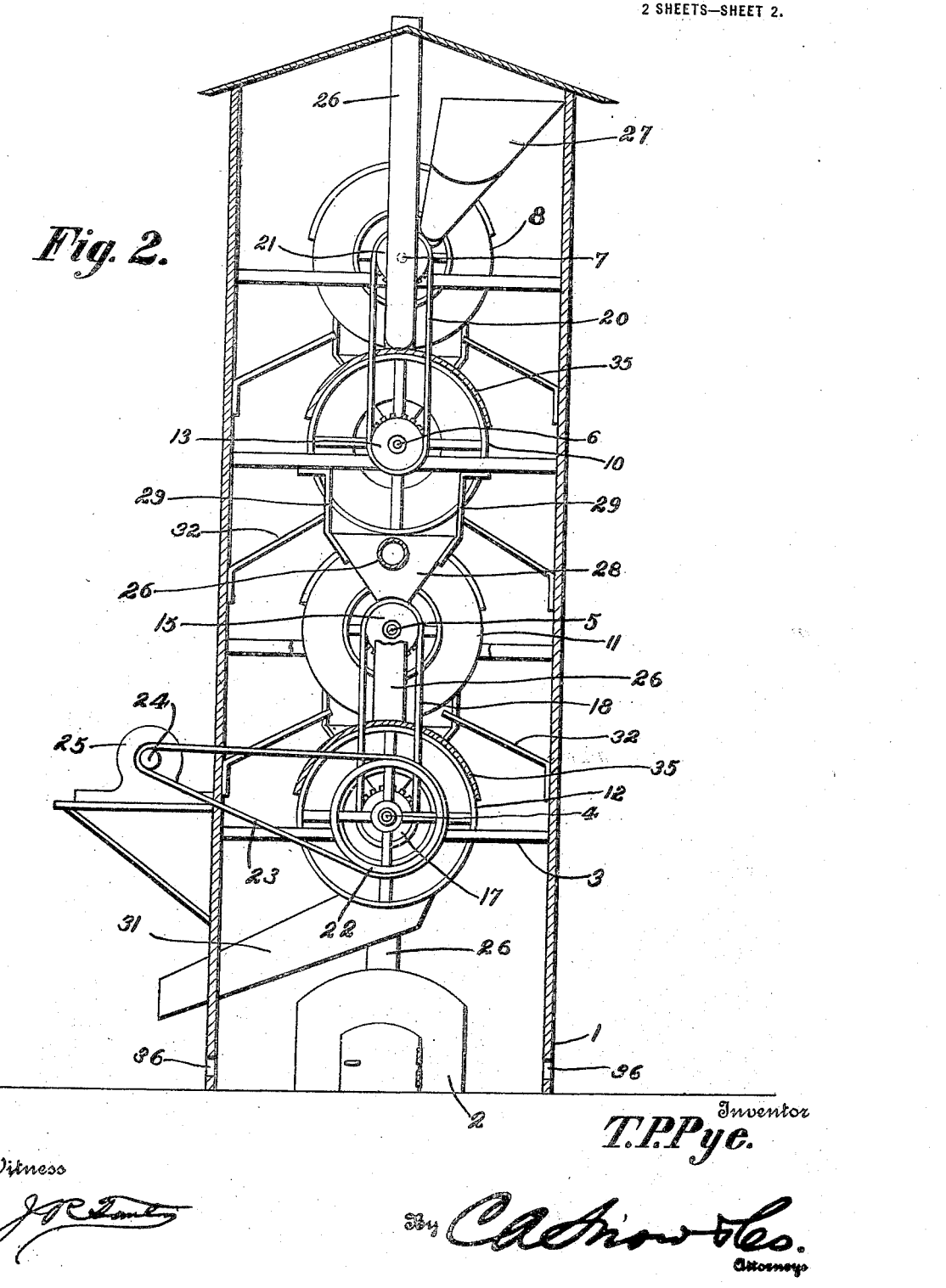
Figure 2 is an end elevation of the drying drums and a portion of the operating mechanism, the housing being shown in section.

Referring to the figures by characters of reference 1 designates an enclosure or housing in the lower portion of which is arranged a heating furnace 2 of any preferred construction. Extending transversely of the housing near the end thereof are superposed cross beams 3 arranged in pairs and journaled on the beams of each pair is a longitudinal shaft. These shafts are superposed and have been indicated at 4, 5, 6 and 7. Secured to the upper shaft 7 is an elongated frusto-conical drum 8 open at its ends, the same being connected to the shaft by suitably arranged spiders 9 or in any other manner desired. Another similar drum 10 is mounted on the shaft 6 while on the shafts 5 and 4 are arranged similar drums 11 and 12 respectively. The drums 10 and 12 are arranged oppositely to the drums 8 and 11. Secured to the ends of the shaft 6 are sprockets 13 and 14 respectively and sprockets 15 and 16 are secured to the respective ends of the shaft 5. The shaft 4 is extended outside of the housing and has a sprocket 17 adapted to transmit motion through a chain 18 to the sprocket 15. Another chain 19 serves to transmit motion from the sprocket 16 to the sprocket 14 while a third chain 20 transmits motion from the sprocket 13 to a sprocket 21 secured to the upper shaft 7. That portion of the shaft 4 projecting outside of the housing 1 has a pulley 22 adapted to receive motion through a belt 23 from a pulley 24 driven by a motor 25.

A heat conducting pipe 26 is extended from the furnace or heater 2 and is extended along zig-zag lines upwardly between the drums, the upper end of the pipe opening through the top of the housing.

A feed spout 27 extends through one wall of the housing 1 near the top thereof and is adapted to discharge material into the small end of the upper drum 8. A hopper 28 is located under the large end of each of the drums 8, 10 and 11, the same being supported from the adjacent cross beams 3 by hangers 29. Each of these hoppers has an outlet spout 30 extending therefrom and opening into the small end of the next adjoining drum thereunder. Arranged under the large end of the lower drum 12 is a delivery spout 31 extending through one wall of the housing 1.

Arranged upon the side walls of the housing 1 are upwardly converging baffle plates or deflectors 32 extending close to the lower portions of the drums and which serve to force heated air, ascending within the housing 1, to follow a tortuous passage around the drums to a suitably disposed outlet opening 33 in the top of the housing.

Arranged in the end walls of the housing 1 are upwardly extending air passages 34 opening into the external atmosphere and discharging into these air passages are hoods 35 mounted on the large ends of the drums and adapted to convey heated moisture from the drums to the air passages so that the same can escape to the external atmosphere.

In using the apparatus fuel is ignited in the furnace or heater 2 and the products of combustion will flow outwardly through the tube or flue 26, thereby quickly heating the air in the housing 1 and also heating the contents of the drums. The air heated within the housing will be caused to circulate around the baffle plates as will be obvious, fresh air entering the lower portion of the housing at any suitable points through openings such as indicated, for example, at 36. The fruit or other material to be dried is supplied to the upper drum 8 through the spout 27 and will be tumbled about in said drum as it is rotated, it being understood of course that all of the drums are simultaneously rotated by the operation of the motor. As the material is agitated in the drum 8 it will gradually feed toward the large end of the drum and then be delivered into hopper 28 which will direct it to the small end of the drum 10. Here the same operation that took place in the drum 8 will be repeated. Similar operations take place in the drums 11 and 12, the material finally being delivered to the spout 31. Obviously as the material is being agitated in the drums the moisture is being driven therefrom and will pass outwardly through the hoods 35. The mechanism is so timed that when the material reaches the spout 31 it will be thoroughly dried ready for packing.

It will be understood of course that any desired number of drums can be used.

It is of course unnecessary to have the outlet opening 33 and the inlet opening 36 as the heated air can be retained in the housing and merely allowed to circulate back and forth to maintain a uniform heat.

What is claimed is:

In a drier the combination with a heater, of superposed frusto-conical drums above the heater and revoluble about parallel axes, each drum being disposed oppositely to the next adjoining drum and being open at both ends, a heat conducting pipe extending from the heater and back and forth between the superposed drums, a housing completely enclosing the heater and drums, said pipe opening through the top of the housing, flues upon opposite walls of the housing and opening through the top thereof, means extending from the upper portions of the large open ends of the drums for conducting moisture laden air to the flues, and a delivering element for conducting material from the lower portion of the large end of each drum to the upper portion of the small end of the next adjoining drum thereunder, and means for rotating the drums simultaneously.

In testimony that I claim the foregoing as my own, I have hereto affixed my signature in the presence of two witnesses.

THOMAS P. PYE.

Witnesses:
I. B. CUNNINGHAM,
H. J. FRAZIER.